United States Patent
Glinkowski et al.

(10) Patent No.: US 6,642,806 B1
(45) Date of Patent: Nov. 4, 2003

(54) HIGH FREQUENCY SUPPRESSION DEVICE

(75) Inventors: Mietek T. Glinkowski, Raleigh, NC (US); Marty L. Trivette, Cary, NC (US)

(73) Assignee: ABB Inc., Raleigh, NC (US)

( * ) Notice: Subject to any disclaimer, the term of this patent is extended or adjusted under 35 U.S.C. 154(b) by 0 days.

(21) Appl. No.: 09/939,856

(22) Filed: Aug. 27, 2001

(51) Int. Cl.⁷ .................................... H03H 7/01
(52) U.S. Cl. ........................... 333/12; 333/181
(58) Field of Search .................... 333/12, 181, 182, 333/185; 307/105

(56) References Cited

U.S. PATENT DOCUMENTS

| | | | |
|---|---|---|---|
| 3,768,011 A | 10/1973 | Swain | 324/117 R |
| 4,191,986 A | 3/1980 | ta Huang et al. | 361/58 |
| 4,345,292 A | 8/1982 | Jaeschke et al. | 361/94 |
| 4,348,638 A | 9/1982 | Boldridge, Jr. | 324/127 |
| 4,358,808 A | 11/1982 | Praeg | 361/11 |
| 4,434,396 A | 2/1984 | Montague | 323/230 |
| 4,558,310 A | 12/1985 | McAllise | 340/661 |
| 4,742,294 A | 5/1988 | Gallios | 324/117 R |
| 4,786,862 A | 11/1988 | Sieron | 324/126 |
| 4,814,941 A | 3/1989 | Speet et al. | 361/334 |
| 4,855,671 A | 8/1989 | Fernandes | 324/127 |
| 5,185,591 A | 2/1993 | Shuey | 340/310 A |
| 5,461,351 A * | 10/1995 | Shusterman | 333/181 |
| 5,652,521 A | 7/1997 | Meyer | 324/551 |
| 5,739,997 A | 4/1998 | Gross | 361/19 |
| 5,767,667 A | 6/1998 | Shafie | 324/117 R |
| 5,793,214 A | 8/1998 | Wakamatsu | 324/601 |
| 5,969,583 A * | 10/1999 | Hutchison | 333/181 |
| 6,218,913 B1 * | 4/2001 | Pagenkopf | 333/181 |

FOREIGN PATENT DOCUMENTS

JP 05-327265 * 12/1993 ............ H05K/9/00

OTHER PUBLICATIONS

Hitachi Metals, Ltd., Mn–Zn Ferrite material, 2001.*

* cited by examiner

Primary Examiner—Seungsook Ham
(74) Attorney, Agent, or Firm—Woodcock Washburn LLP (57) ABSTRACT

A device and method for filtering high frequency transients from medium and high voltage conductors is disclosed. The device for filtering medium voltage and high voltage conductors comprises an interior surface and an exterior surface and a material located between the interior surface and the exterior surface. The material filters the medium voltage and/or high voltage conductors by passing signals in a first frequency range and impeding signals in a second frequency range.

11 Claims, 8 Drawing Sheets

HIGH FREQUENCY SUPPRESSION DEVICE

FIELD OF THE INVENTION

The invention relates to frequency suppression devices and more particularly to magnetic frequency suppression devices used in medium and high voltage power systems and data communication systems.

BACKGROUND OF THE INVENTION

Very fast transients (VFT's) and high frequency (HF) harmonics are becoming ubiquitous in electrical power transmission and distribution systems. Transients are an electrical phenomena that appear as rapid voltage fluctuations in an electrical system. Therefore, an electrical power system not only carries a productive power signal, for example, operating at 60 Hz, but also inadvertently carries transients and harmonics operating at frequencies other than 60 Hz. As such, VFT's and HF harmonics compromise power quality and often disrupt industrial processes causing equipment damage and expensive downtime. Essentially, power quality is a performance measure for electrical power. Power quality has become essential in today's electronics-based world where electrical equipment has become increasingly sensitive to variations in power. Therefore, power quality must be kept high in order to meet the electrical demands of such equipment.

Power quality is kept high by decreasing the occurrence of VFT's and HF harmonics in medium and high voltage electrical systems. Traditionally, inductor-capacitor (LC) filters have been used to decrease the occurrence of transients and harmonics by electrically filtering such transients and harmonics from the electrical system. LC filters typically include an inductor and capacitor connected in series or in parallel and are electrically coupled to the electrical system. There are, however, several disadvantages to using LC filters. First, because the LC filter is electrically coupled to the system, installation costs are relatively high for implementing the intrusive filter into the system and maintenance costs are incurred in periodically maintaining the filter. Second, the large size of the filters often hinder the installation process and therefore also raise costs.

Toroids provide another way of decreasing VFT's and HF harmonics. Unlike LC filters, toroids filter non-intrusively transients and harmonics from an electrical system using electromagnetism. Generally, toroids are donut shaped, i.e. with a circular shape and a circular aperture. The electrical conductor extends through the toroid's aperture. Toroids are made from magnetic materials having a relative permeability and resistivity, that determine the toroid's effectiveness in suppressing VFT's and HF harmonics. That is, as electrical power passes through the conductor extending through the center of the toroid, the toroid's magnetic properties suppress the VFT's and HF harmonics carried by the conductor. The toroid may be constructed to selectively filter certain frequencies from the conductor. While high frequency (HF) toroids have been used to suppress transients in low voltage applications, such as personal computer monitor cables, toroids have not been not used in medium or high voltage applications.

For the foregoing reasons, there is a need for a simple, low cost and easily installable high frequency suppression device that can maximize power quality in medium and high voltage industrial distribution systems without introducing significant losses to the desired frequency.

SUMMARY OF THE INVENTION

The invention provides a device that selectively and magnetically filters HF transients from an industrial distribution system or an electrical power system without introducing any losses or compromising the power signals operating at about 50–60 hertz. The invention is a simple, low cost, and easily installable high frequency suppression device that improves power quality in industrial distribution systems.

The toroid filters medium voltage and high voltage conductors. The toroid includes an interior surface, an exterior surface and a material located between the interior surface and the exterior surface. Such material magnetically filters the medium voltage and/or high voltage conductors by passing signals in a first frequency range and impeding signals in a second frequency range.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

The invention is directed to a toroid that suppresses high frequency transients in medium and high voltage industrial distribution systems. The toroid is circular in shape with a circular aperture and is installed on a conductor by placing the conductor through the circular aperture of the toroid. According to the invention, the toroid has a certain relative permeability and resistivity characteristics that filter high frequency transients from the conductor. That is, as power passes by the toroid placed on the conductor, the toroid magnetically filters transients in the conductor.

It should be appreciated that the invention will be described as being used in a power distribution system, however, other medium and high voltage systems, such as, for example, a high and medium voltage transmission system may be used without departing from the scope of the invention.

Figure 1:
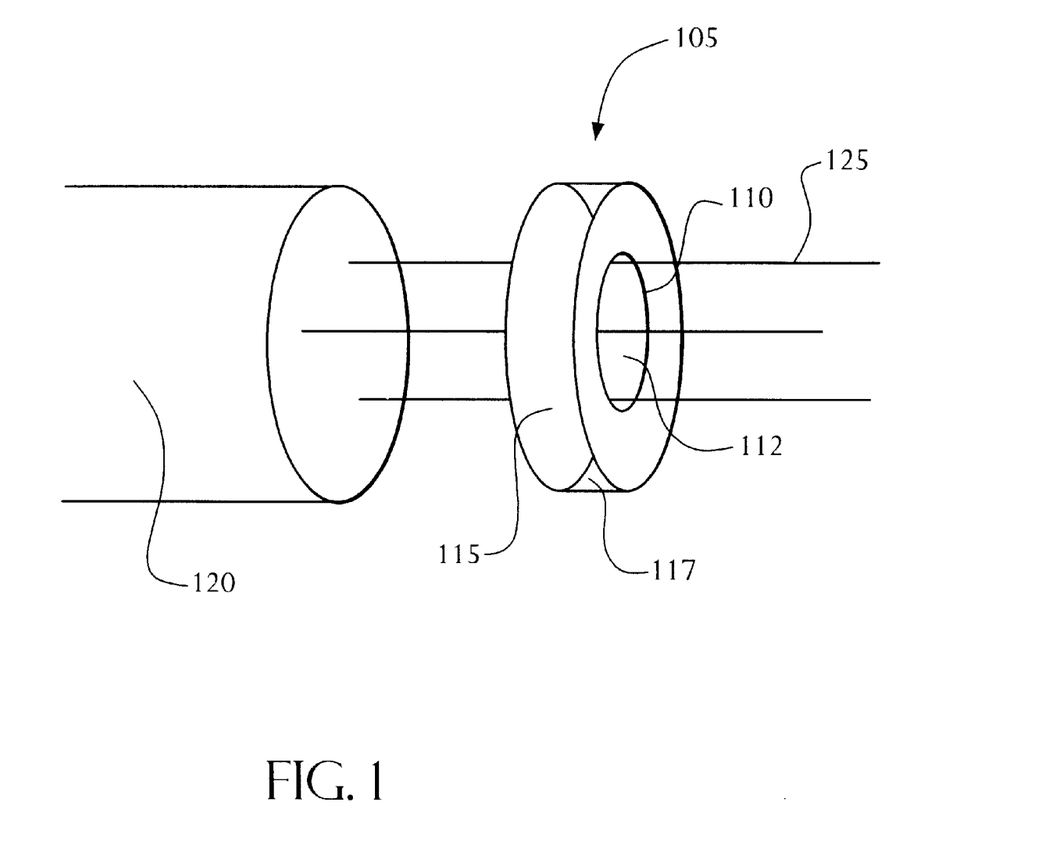
FIG. 1 is a perspective view of a high frequency suppression device, according to the principles of the invention.

Referring to the drawings wherein like numerals represent like elements throughout, there is shown in FIG. 1 a toroid 105 according to the principles of the invention. As shown, toroid 105 includes an interior surface 110, an exterior surface 115, an aperture 112 and a passive magnetic material 117 between interior surface 110 and exterior surface 115.

Toroid 105 has a thickness that is determined by measuring the distance between the exterior surface 115 and the interior surface 110. In one embodiment, toroid 105 has a thickness of about 0.25 inches. However, toroid 105 may have different thickness, such as, for example, the thickness of the toroid may depend on the size of the conductor the toroid filters without departing from the principles of the invention.

As shown, toroid 105 is positioned such that conductors 125 of a power or signal transmission line 120 extend through aperture 112 of toroid 105. In this manner, all three conductors are filtered by one toroid 105. The size of the aperture 112 will vary according to the number and size of the conductor(s) that extends through it. Toroid 105 generates a magnetic field (not shown) from magnetic material 117 that has higher impedance at high frequencies and lower impedance at low frequencies. Consequently, signals having high frequencies, such as, for example, high frequency transients, will be filtered from conductors 125 while signals with a low frequency, such as, for example, 60 Hz AC power signals, will pass through the conductor without significant losses.

Figure 2:
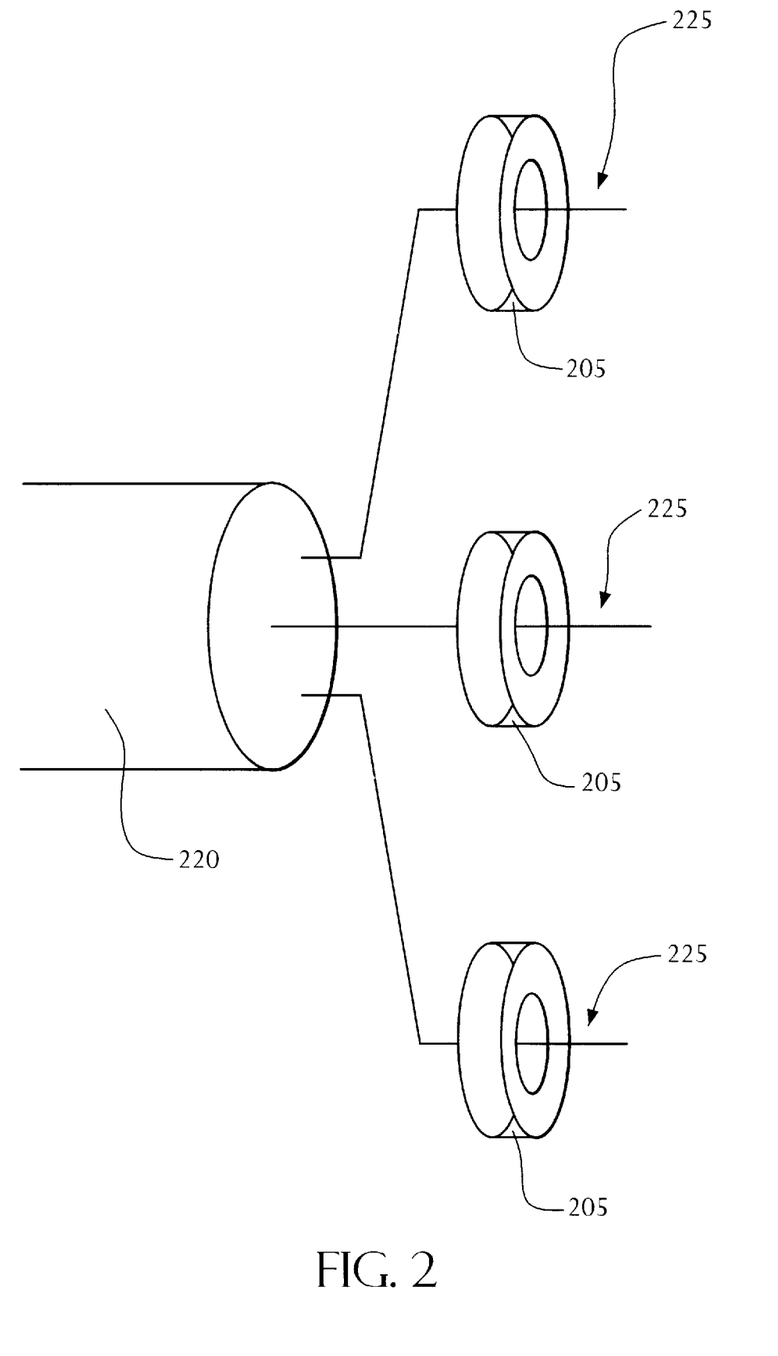
FIG. 2 is a perspective view of multiple high frequency suppression devices, according to one embodiment of the invention.

FIG. 2 shows toroid 105 of FIG. 1 in another embodiment of the invention. As shown, toroid 205 is positioned such that each conductor 225 of the transmission line 220 extends through a separate toroid 105. Hence, as shown, there are three toroids 205 and three conductors 225. In this embodiment, one toroid filters one conductor. Therefore, it should be appreciated from FIG. 2 that the invention may be used with any number of toroids and any number of conductors without departing from the scope of the invention.

Figure 3:
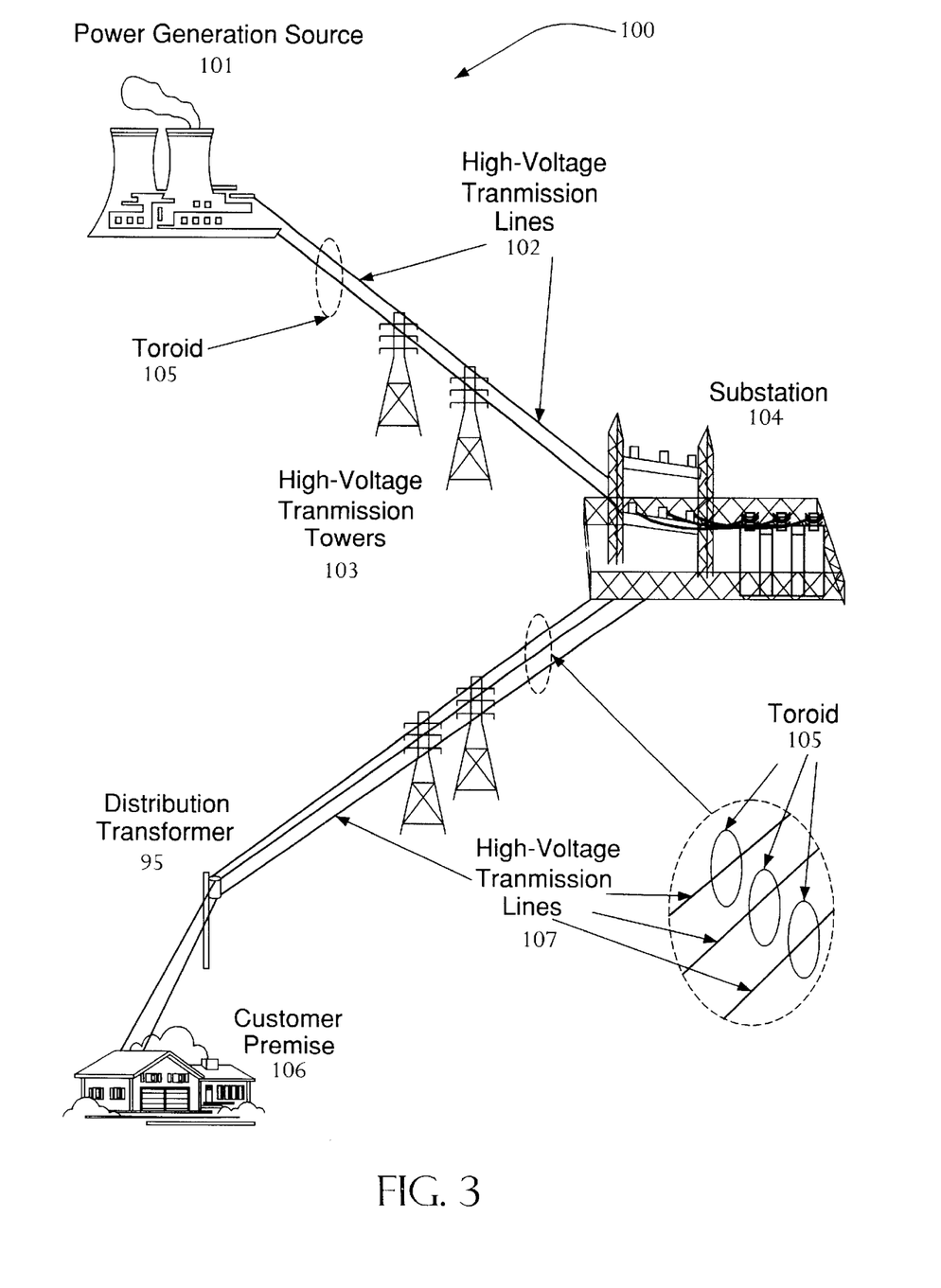
FIG. 3 is a block diagram illustrating an exemplary power system having toroids, according to the invention.

FIG. 3 is a block diagram illustrating, in an exemplary manner, a power system 100 with toroids according to the invention. Power system 100 as illustrated, shows power generation source 101 delivering power along transmission lines 102 to substation 104. Subsequently, substation 104 delivers the power along transmission lines 107 to a distribution transformer 95. Distribution transformer 95 then delivers the power to a customer premise 106. As shown, customer premise 106 is a house, however, the customer premise could vary without departing from the scope of the invention. For example, the customer premise could be a factory, retail store or the like without departing from the scope of the invention.

Toroids 105, according to the invention, may be used in various places on transmission lines 102, 107 throughout power system 100. FIG. 3 shows a toroid 105 between power generation source 101 and substation 104 on transmission lines 102. Toroid 105 on transmission lines 102 surrounds three conductors (i.e., each conductor is within a transmission line) and therefore one toroid 105 filters the transients and harmonics that appear in all three transmission lines 102 between power generation source 101 and substation 104.

FIG. 3 also shows toroids 105 between substation 104 and distribution transformer 95 along transmission lines 107. As shown, each conductor of transmission line 107 has a separate toroid 105 on such conductor. Therefore, each toroid 105 along transmission lines 107 filters transients and harmonics that appear in each conductor of transmission lines 107 between substation 104 and distribution transformer 95

As stated above, the relative permeability and resistivity of the magnetic material 117 of toroid 105 are two properties that determine the ability of toroid 105 to suppress or filter certain frequency transients in the conductor. In other words, as the toroid's relative permeability and resistivity change, the toroid suppresses different transients (i.e. transients of different frequencies). Therefore, the combination of the toroid's relative permeability and resistivity dictate which transients the toroid will suppress.

According to the invention, a toroid having a magnetic material filters high frequency transients from a transmission or power line(s) yet passes low frequency signals (such as power signals). In this sense, a toroid is placed on a transmission line in a power distribution system, such as that shown in FIG. 3. Then, as power is delivered from power generation source 101, the toroid filters out transients and/or harmonics that appear in the power being delivered. Thus, the power being delivered according to the invention, i.e., from an industrial distribution system using toroids, has a higher power quality (i.e., power having less transients and harmonics) than power from an industrial distribution system without the use of toroids.

Figure 4:
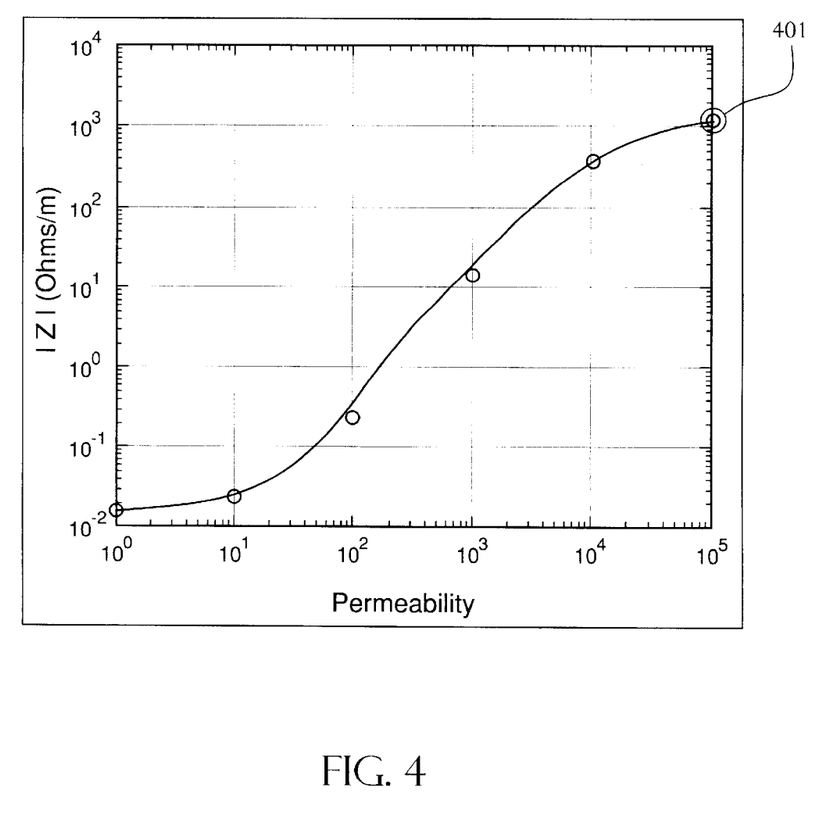
FIG. 4 is a graph representing the impedance of a toroid as a function of the permeability.

FIG. 4 is a graph representing a simulation that calculates the impedance of a toroid as a function of the relative permeability. In other words, a transient operating at a certain frequency will see the toroid has having a different impedance depending on the relative permeability. For purposes of the simulation, the conductivity of the toroid was set to about 2 Siemens per meter (S/m) and the source frequency was about 200 kHz. As shown, the relationship between the impedance and permeability of the conductor is a non-linear one. More specifically, the increase in impedance begins to level at 401. Additionally, 401 represents the permeability where the impedance is the greatest. In one embodiment of the invention, the permeability of the toroid is 10,000 or point 401. A toroid with a relative permeability of 10,000 appears to signals, such as, for example, transients operating near 200 kHz, as having a large impedance and therefore provides for better filtering capabilities.

Figure 5:
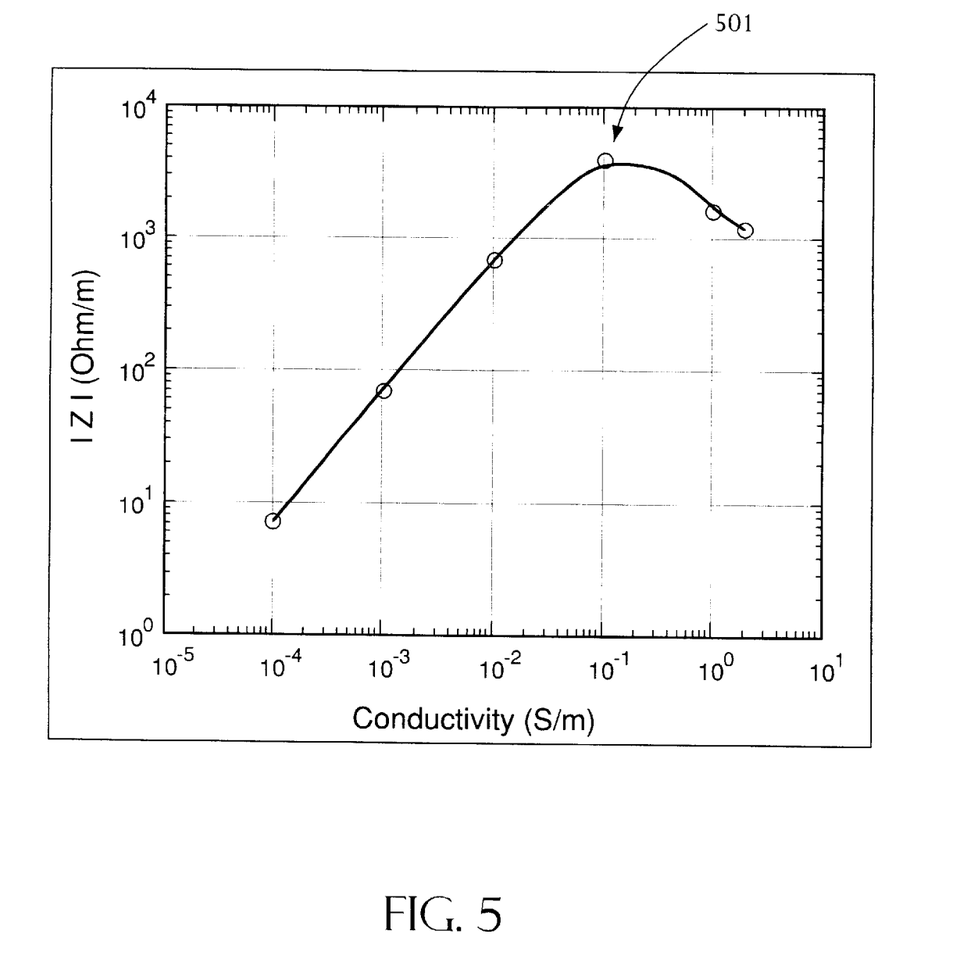
FIG. 5 is a graph representing the impedance of a toroid as a function of conductivity.

FIG. 5 is a graph representing a simulation for calculating the impedance of a conductor as a function of the conductivity. For purposes of the simulation, the relative permeability was set to about 100,000 (401 from FIG. 4) and the source frequency was again about 200 kHz. That is, a transient operating at 200 kHz will see the toroid as having an impedance varying according to the toroid's conductivity. As shown, the maximum impedance occurs at 501 where conductivity is 0.1 S/m. Therefore, a transient operating near 200 kHz will see the toroid as having the largest impedance when the toroid's conductivity is 0.1 S/m. In one embodiment of the invention, the toroid has a conductivity of 0.1 S/m.

Accordingly, in one embodiment of the invention, a toroid having a relative permeability of 10,000 and a conductivity of 0.1 S/m is optimal in suppressing high frequency signals in a conductor while passing low frequency signals in the same conductor.

Figure 6:
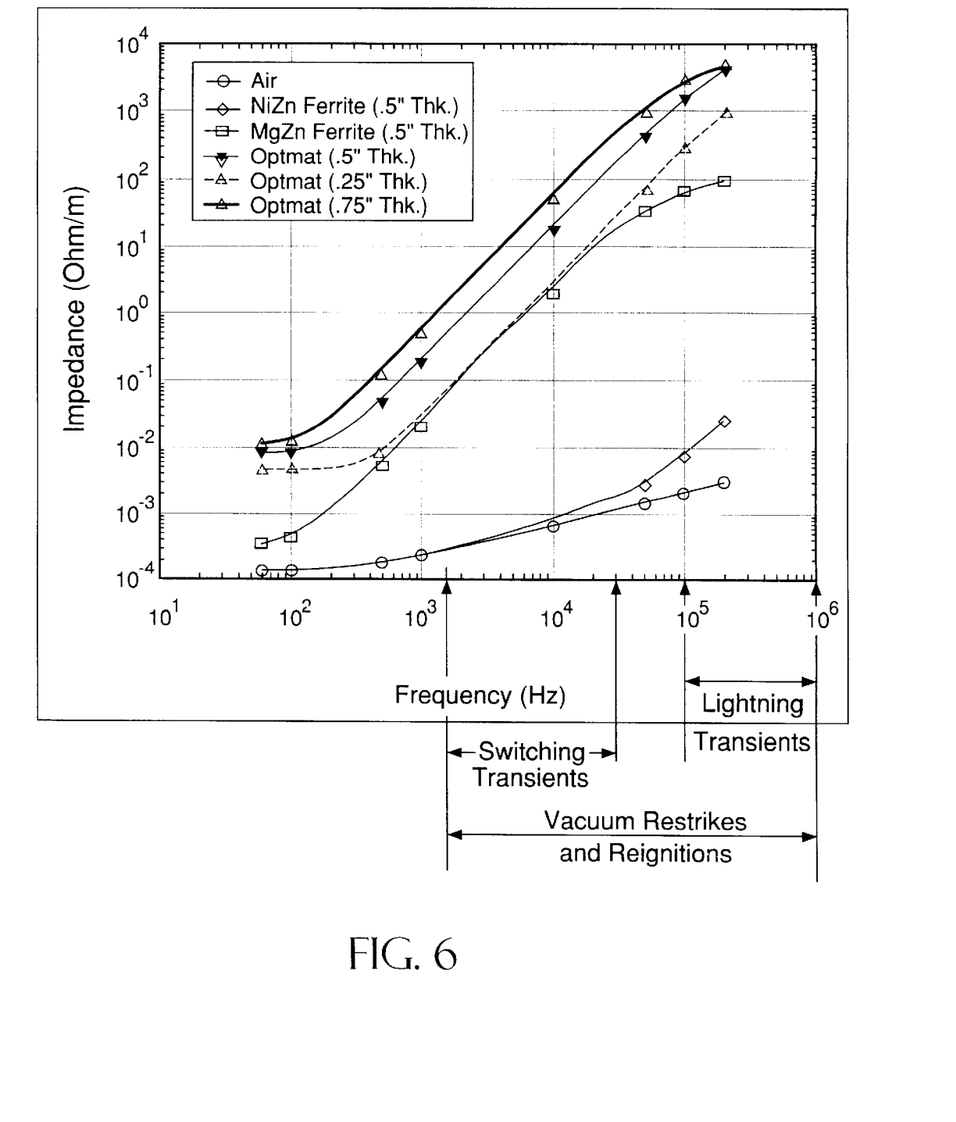
FIG. 6 is a graph representing the impedance of a toroid as a function of frequency for various toroid materials.

FIG. 6 is a graph representing the impedance of a conductor as a function of frequency. For illustration purposes, FIG. 6 shows the frequency range at which switching transients, lightening transients, and vacuum restrikes and re-ignitions occur. Using the optimal parameters as stated above, the frequency dependency of the impedance of the conductor is simulated for different toroid materials and thickness. FIG. 6 represents the results of the simulation. A ferrite composed primarily of Zinc and Nickel with relative permeability of 160 and conductivity of 0.1 S/m, a ferrite composed primarily of Magnesium and Zinc with relative permeability of 3400 and conductivity 10 S/m and air with relative permeability of 1 and conductivity of 0 S/m were also used in the simulation.

In one embodiment of the invention, the toroid material for a high frequency suppression device in an electrical power system is one that exhibits minimal impedance at low frequencies (such as, for example about 50–60 Hz or any conventionally frequency used in transmitting power) and high impedance at high frequencies. Using these criteria, in one embodiment of the invention, a toroid is composed of the material represented by curve 600.

Figure 7A:
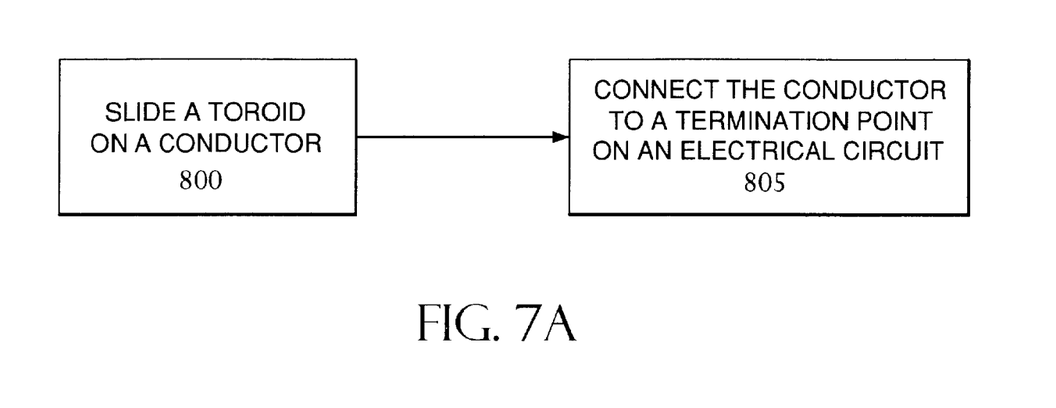
FIGS. 7A and 7B are block diagrams illustrating methods of installing a toroid, according to the invention.
Figure 7B:
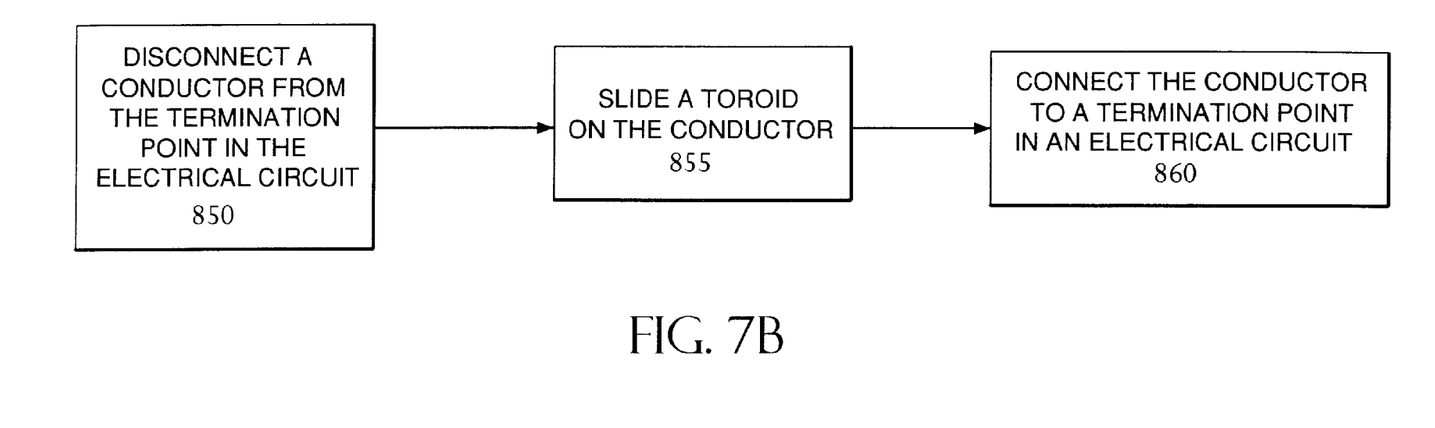

FIG. 7A and 7B illustrate methods of installing a toroid, according to the invention. In FIG. 7A, a toroid is installed in a new distribution network. At step 800, the toroid is implemented into the network by inserting a conductor through a toroid, such as, for example, sliding the toroid onto the conductor or transmission line before the conductor or transmission line is implemented into the power system. After placing the toroid around the conductor, the conductor then must be connected to a termination point in the network at step 805. A termination point can be any point at which one component of a network connects to another component, such as, for example, transformers, power panels, distribution boxes or the like.

In FIG. 7B, the toroid also can be installed and used in an existing network. At step 850, the conductor or transmission line must first be disconnected from the network. The toroid can then be implemented into the existing network by placing the transmission line through the toroid or sliding the toroid onto the disconnected conductor at step 855. The conductor is then connected to a termination point of the network at step 860.

The methods described in FIGS. 7A and 7B provide a non-intrusive method of installing a high frequency suppression device into a power system. The non-intrusive methods described are advantageous to intrusive methods, such as those used for implementing an LC filter, because such intrusive methods require an electrical connection to the power system. For example, to electrically implement an LC filter into an existing power system, the power system would have to be spliced and the filter electrically connected to the power system. Splicing requires a portion of the power system to be powered off and the LC filter is physically and permanently connected to the system. The non-intrusive method, however, of filtering high frequency transients, according to the invention, does not require splicing or an electrical connection to the power system. Therefore, the toroid can be placed into the system in less time and will reduce expensive system down time.

Figure 8:
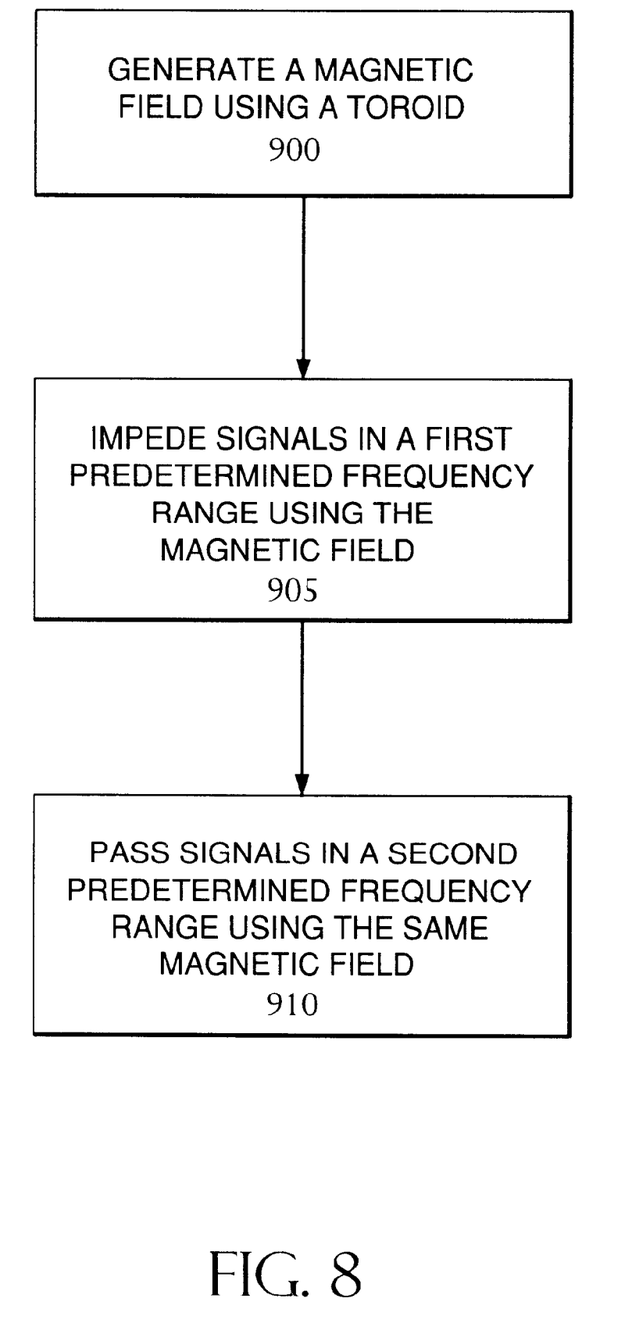
FIG. 8 is a block diagram illustrating a method for filtering medium voltage and high voltage conductors, according to the invention.

FIG. 8 shows a method for filtering medium voltage and high voltage conductors. The method comprises generating a magnetic field using a toroid at step 900. Then, impeding signals in a first predetermined frequency range using the magnetic field at step 905 and passing signals in a second predetermined frequency range using the same magnetic field at step 910.

In one embodiment, the first predetermined frequency range is greater than 60 Hz and the second predetermined frequency range is substantially 50–60 Hz. The selection of these frequency ranges allow a power signal operating around 50–60 Hz, such as those power signals in the United States and Europe, to be passed through a medium and high voltage conductor in an industrial distribution system or an electrical power system while impeding HF transients.

As the foregoing illustrates, the invention is directed to a device, namely a toroid, for selectively suppressing transients in medium and high voltage conductors in an industrial distribution network or electrical power system. It is understood that changes may be made to the embodiments described above without departing from the broad inventive concepts thereof. For example, the thickness of the toroid can vary, such as, for example, depending on the size of the conductor the toroid is to filter. Also, embodiments other than the embodiments shown in FIGS. 2 and 3 can be used. Therefore, the scope of the appended claims should not be limited to the description of the invention contained herein.

What is claimed is:

1. A toroid for filtering at least one medium voltage conductor and/or high voltage conductor, the toroid comprising:

an interior surface;

an exterior surface peripheral to the interior surface defining an aperture; and a material located between the interior surface and the exterior surface, wherein the material filters the at least one medium voltage and/or high voltage conductor by passing signals in a first frequency range and impeding signals in a second, higher frequency range, wherein the first and second frequency ranges are determined by selecting a material having a desired magnetic permeability and electrical conductivity.

2. The toroid of claim 1, wherein the first frequency range is about 50–60 Hertz and the second frequency range is greater than 50–60 Hertz.

3. The toroid in claim 1, wherein a distance between the interior surface and the exterior surface is about 0.25 inches.

4. The toroid in claim 1, wherein the material has a relative permeability of about 100,000.

5. The toroid in claim 1, wherein the material has a conductivity of about 0.1 Siemens/meter.

6. The toroid in claim 1, wherein the interior surface and the exterior surface are circular.

7. A method for filtering at least one medium voltage and/or high voltage conductor using a toroid with a material having a desired magnetic permeability and electrical conductivity, comprising:

passing signals in a medium voltage conductor and/or high voltage conductor in a first frequency range, wherein the first frequency range is determined by selecting a material for the toroid having a combination of electrical conductivity and magnetic permeability; and impeding signals in the medium voltage conductor and/or high voltage conductor in a second, higher frequency range, wherein the second, higher frequency range is determined by the combination of electrical conductivity and magnetic permeability of the selected material.

8. The method of claim 7, wherein the first frequency range is about 50–60 Hz and the second frequency range is greater than 50–60 Hertz.

9. An industrial power system, said system comprising:

at least one conductor; and a toroid surrounding the conductor, comprising:

an interior surface;

an exterior surface peripheral to the interior; and a material located between the interior surface and the exterior surface, wherein the material filters the at least one conductor by passing signals in a first frequency range and impeding signals in a second, higher frequency range, wherein the first and second frequency ranges are determined by selecting a material having a desired magnetic permeability and electrical conductivity.

10. The industrial power system of claim 9, wherein the first frequency range is about 50–60 Hertz and the second frequency range is greater than 50–60 Hertz.

11. A method for filtering medium and/high voltage conductors in an electrical system comprising:

selecting a material based on the conductive and magnetic properties of the material such that the combination of the magnetic and conductive properties of the material will impede signals in a first desired frequency range while passing signals in a second desired frequency range; and forming a toroid from the material such that an interior surface and exterior surface is formed wherein the exterior surface is peripheral to the interior surface.

* * * * *

UNITED STATES PATENT AND TRADEMARK OFFICE
CERTIFICATE OF CORRECTION

PATENT NO. : 6,642,806 B1
DATED : November 4, 2003
INVENTOR(S) : Ginkowski et al.

It is certified that error appears in the above-identified patent and that said Letters Patent is hereby corrected as shown below:

Column 3,
Line 25, "205" should read -- 105 --.

Signed and Sealed this

Thirteenth Day of July, 2004

JON W. DUDAS
*Acting Director of the United States Patent and Trademark Office*